CODED VIDEO SYSTEMS WITH SIGNAL PHASE INVERSION

Filed Oct. 21, 1965 5 Sheets-Sheet 1

INVENTOR
HAROLD R. WALKER
BY John J. Rogan
ATTORNEY

INVENTOR
HAROLD R. WALKER
BY John J. Rogan
ATTORNEY

INVENTOR
HAROLD R. WALKER
BY John J. Rogan
ATTORNEY

Sept. 8, 1970 H. R. WALKER 3,527,877

CODED VIDEO SYSTEMS WITH SIGNAL PHASE INVERSION

Filed Oct. 21, 1965 5 Sheets-Sheet 4

INVENTOR
HAROLD R. WALKER
BY John J. Rogan
ATTORNEY

CODED VIDEO SYSTEMS WITH SIGNAL PHASE INVERSION

Filed Oct. 21, 1965 5 Sheets-Sheet 5

INVENTOR
HAROLD R. WALKER
BY John J. Rogan
ATTORNEY 3,527,877
CODED VIDEO SYSTEMS WITH SIGNAL PHASE INVERSION Harold R. Walker, Metuchen, N.J., assignor to Charger Electronic Systems Inc., New York, N.Y., a corporation of New York
Filed Oct. 21, 1965, Ser. No. 499,401
Int. Cl. H04n 7/18
U.S. Cl. 178—5.1 15 Claims

ABSTRACT OF THE DISCLOSURE

A secrecy video signal transmission system employs periodic reversal of the video signal polarity. Alternate horizontal line periods may be inverted, with accompanying attenuation of low frequency signal components. Synchronizing signals may be inverted or not, as desired.

This invention relates to privacy-guarded communications systems, and more especially it relates to systems wherein informational and control signals can be transmitted in abnormal or coded condition and can be received and decoded to produce their normal condition.

In certain of the arts, for example in the art of transmitting images, whether for entertainment, instruction or other purposes, it is required in certain cases that the transmission be such that a nonsubscriber or other unauthorized person can be effectively precluded from receiving and reproducing the transmitted material in intelligible form. One specific example of such is that involved in so-called subscription television wherein that television or video signals and accompanying sound signals can only be intelligibly reproduced by subscribers whose receiving equipment is provided with special apparatus to effect the intelligent recomposition of the original image and sound.

Accordingly, one of the principal objects of this invention is to provide novel methods and organizations of apparatus for achieving privacy-guarding in electric transmission systems and the like.

Another object is to provide novel methods and apparatus for converting normal image electric signals into abnormal or coded signals wherein the coding is such as to reduce to the greatest extent the chances of unauthorized interception and intelligible reconstruction of the original image.

A further object is to provide novel methods and apparatus for television transmission whereby the usual composite television signal which includes so-called video elements and control elements such as sync pulses and the like, can be modified or distorted at the transmission point in such a way that the chances of intelligible reproduction by conventional television receivers is impractical unless such receivers are equipped with special signal reconstituting circuits according to the invention.

A further object is to provide methods and apparatus for privacy-guarded subscription television systems and the like, wherein the signals at the transmitter are subjected to a plurality of distinct coding procedures which conjointly cooperate to render impracticable the unauthorized deciphering and intelligible reproduction except by special receiving circuits which also form a distinct feature of the invention.

One feature of the invention relates to a television transmitting arrangement wherein the usual video signals are subjected at predetermined timed intervals to a reversal of their polarity phase so that alternate line scans, of a frame or groups or portions of such line scans, are translated into oppositely phased video signals. As a result of this, the signals, if received by unmodified television receiving circuits, merely result in an overall grayish or similar uniform lighting of the television picture tube without the reproduction of intelligible images thereon. Thus only those receivers which are equipped with appropriate line scan and synchronized re-reversal circuits are capable of reproducing the original images in satisfactory form.

Another feature relates to a coding arrangement for television transmission and reception wherein the original video signals are subjected to a predetermined distortion such as attenuation confined to one particular range, for example the lower frequency range of the video signals, and a complementary signal restoring arrangement is provided at the receiver.

Another feature relates to a coding arrangement for television transmission and reception wherein a plurality of distinct, conjointly operative coding arrangements are employed at the transmitter and complementary decoding arrangements are employed at the receiver.

A further feature relates to a novel, electronically timed video signal-inverting arrangement whereby alternate video line scan signals can be inverted under control of the standard horizontal synchronizing pulses to produce a coded video signal for privacy-guarded transmission and reception.

A further feature relates to a privacy-guarded television system wherein the television signals at a transmitter are subjected to at least three different types of coding, namely alternate video line scan inversion; alternate video line scan inversion plus synchronizing pulse inversion; and attenuation distortion plus alternate video line scan inversion with or without inversion of the standard sync pulses, the foregoing in conjunction with a set of manually operable switches at the transmitter for determining the particular combination of coding effects to which the transmitted signals are to be subjected.

A further feature relates to the novel organization, arrangement and relative location and interconnection of parts which cooperate to provide an improved privacy-guarded communications system of the image transmitting kind.

Other features and advantages not specifically enumerated will be apparent after a consideration of the following detailed descriptions and the appended claims taken in conjunction with the attached drawing wherein, FIG. 1*a* is a composite schematic wiring diagram of part of a television transmission system embodying the invention. FIG. 1*b* shows the remaining part of the system of FIG. 1*a*. FIGS. 1*a* and 1*b* when placed alongside of each other, as indicated by the arrows, illustrate the complete system;

Figures 1A, 3:
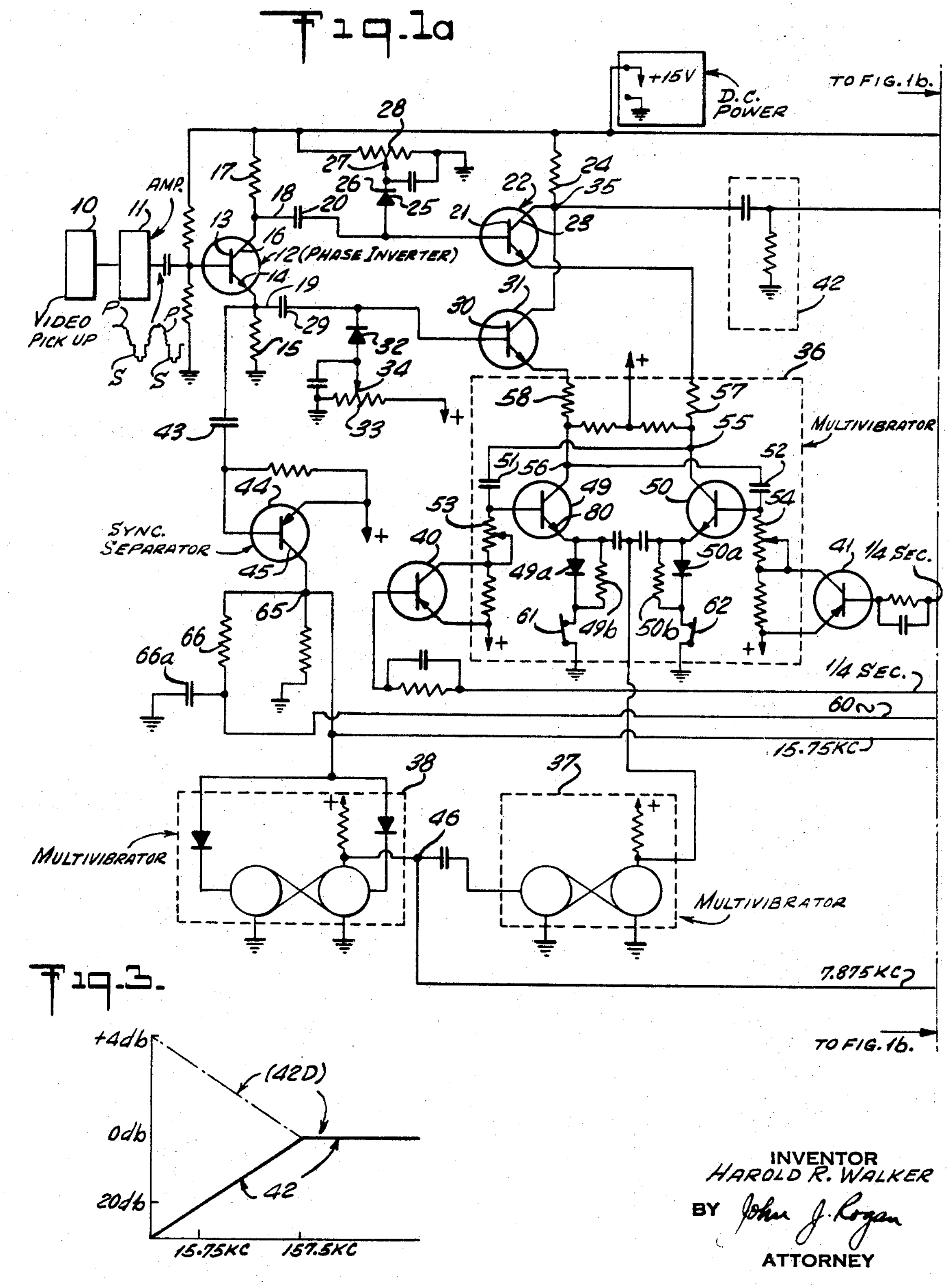
FIG. 3 is a graph showing the attenuation characteristics of the encoding filter that is alternatively used with the transmitter of FIG. 1 at FIG. 1*b* and the corresponding decoding filter that is used at the receiver.
Figure 1B:
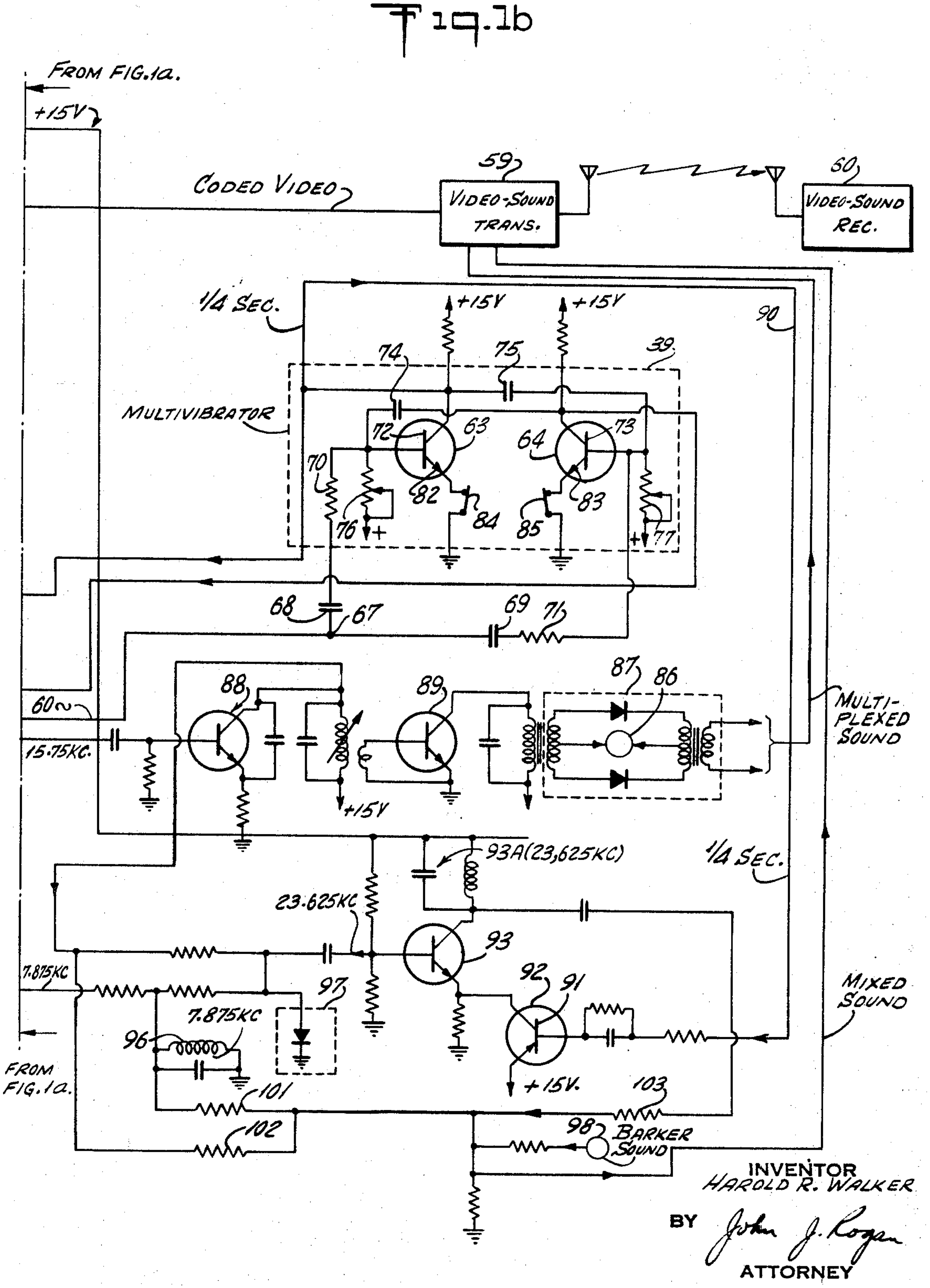
Figure 2:
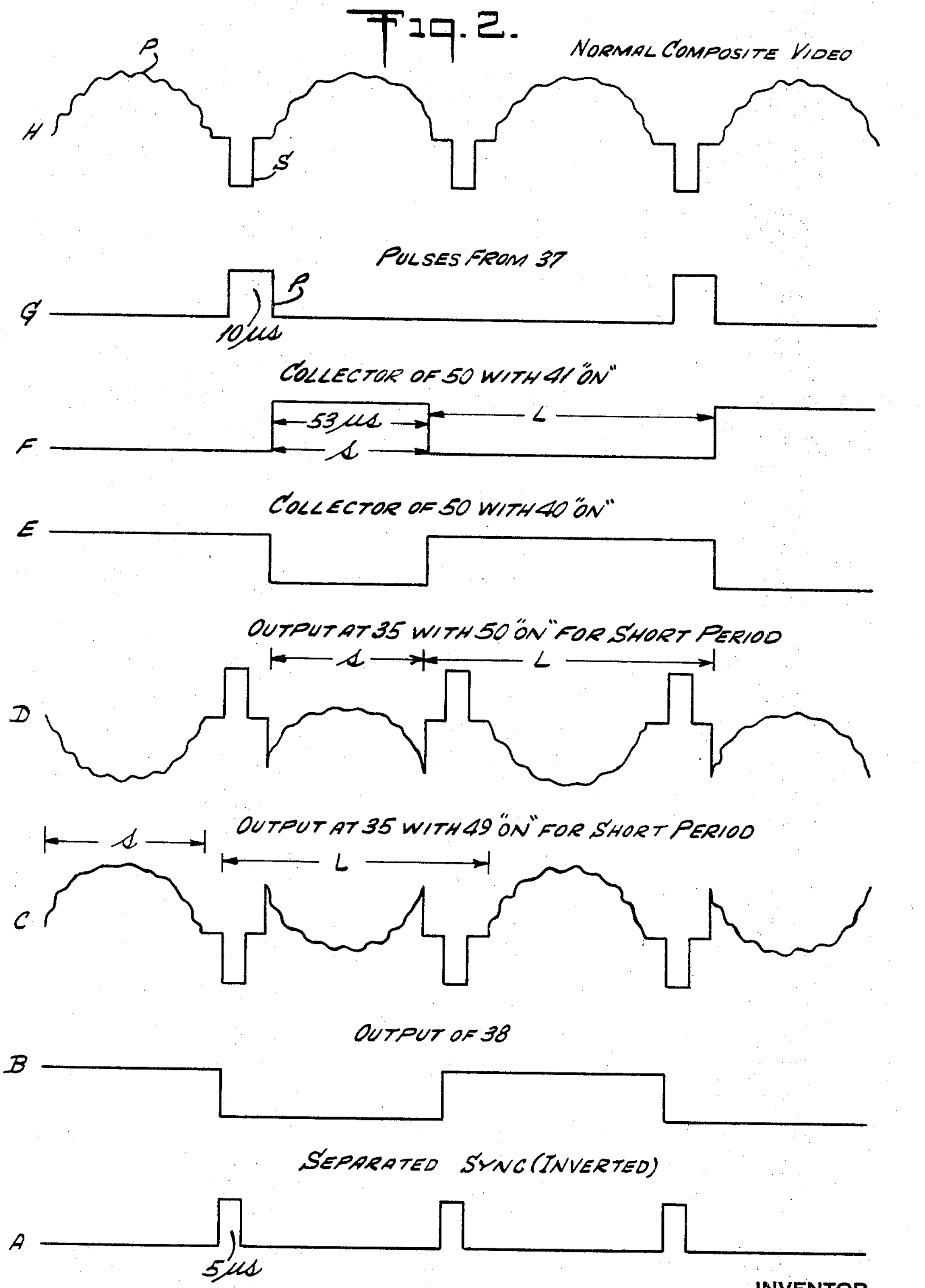
FIG. 2 is a series of graphs used in explaining the invention.

Referring to FIG. 1*a* and FIG. 1*b*, the block 10 represents any known television signal and transducing equipment by means of which the lights and shades of subject matter are translated into corresponding television electric signals. The output of the device 10 contains the usual picture shade signals as well as the usual synchronizing and blanking pulses referred to herein as the composite video signal. Since the present invention is concerned primarily with the horizontal synchronizing pulses with relation to the video signals per se, only that portion of the transduced signal sequence showing the video signal and the associated horizontal synchronizing pulses are indicated in FIG. 1*a* and in graph H of FIG. 2. The composite video signal from device 10 is amplified in a suitable amplifier 11. In accordance with present television standards established by the FCC, the usual practice is to confine the video modulations between 15% and 75% of the carrier amplitude. The remaining 25% beyond the picture signal level is used for the various synchronizing pulses and blanking pulses. The horizontal synchronizing pulses are indicated in FIG. 2 by the letter S and the video modulations are represented by the letter P. In present United States standard television practice the upper limit of the picture modulations represents black in the subject matter being transmitted, and white in the said subject matter is represented by the minimum picture signal modulations. In other words, according to FCC standards, black is represented by maximum television transmitter output. In some other countries the reverse is true; the upper limit of the picture or video modulations P represent white, and black is represented by the minimum picture or video signal modulations. When the picture modulations are such as to vary from black (maximum modulation) towards white (minimum modulation), they are referred to herein as in the positive-going phase; whereas when the picture signals are varying from white (maximum modulation) towards black (minimum modulation), they are referred to as in the negative-going phase. In the conventional television transmission systems, as standardized in the United States, each elemental electric signal modulation or pulse is represented by a positive-going phase.

The composite video signal is applied to a phase inverter 12 of any known kind which, merely for illustration, is represented by a transistor having its base 13 connected to amplifier 11 and its emitter 14 returned to ground through a cathode load resistor 15 and its collector 16 connected to the positive D.C. potential point of a suitable power supply for example 15 volts and through a load resistor 17. By the known action of such an inverter the phase of the composite video signals on conductor 18 are 180° out of phase with thhe composite video signals on conductor 19. The signals on conductor 18 are connected through a coupling condenser 20 to the base 21 of a gated transistor amplifier 22 whose collector 23 is connected to the positive anode voltage through a load resistor 24. The appropriate direct current level of the video signals applied to base 21 is restored in the known manner by a clamping rectifier or diode 25 whose anode 26 is connected to an adjustable tap 27 on the potentiometer resistor 28. Similarly, the load resistor 15 is connected through coupling condenser 29 to the base 30 of another gated transistor amplifier 31 and the direct current in the signal is restored by means of a similar clamping diode 32 and potentiometers 33, 34. The amplifiers 22 and 31 are arranged to beg ated on, that is, to pass an output signal to the common connection point 35 in respective timed relation under control of a free-running gating multivibrator 36 which in turn is jointly controlled by a one-shot multivibrator 37 and by a scale-of-two pulse counter 38, and also by the pulse inverting multivibrator 39 and the triggering transistors 40 and 41.

As shown in FIG. 2 by the graph F the multivibrator 36 can be controlled so as to have recurrent long and short periods L and *s*. The inversion function of the system is capable of operating in two ways represented respectively by graphs C and D, FIG. 2. Thus in the condition of graph C the alternate video signals P are inverted while all the sync pulses S remain uninverted. In the condition of graph D the video signals are also alternately inverted and all the sync pulses likewise are inverted. Furthermore, in the condition of graph C the uninverted video signals occupy the short period *s* while the inverted video signals and the uninverted sync signals occupy the long period L. On the other hand, in graph C the uninverted video signals occupy the short period *s* while the long period L is occupied by the inverted video signals and the accompanying period of inverted sync pulses. The relative timing of the long and short pulses is dependent upon the effect of another multivibrator 39 which can control the side of 36 which switches "long," and the side of 36 which switches "short." For example, if 31 is to be on for the short period (53 microseconds), then 50 must be in the off state, and 49 must be in the on state. That condition requires 41 to be on. Reversely, if 22 is to be on for the short period, then 50 must be in the on state and 49 in the off state.

The emitter circuits of 49 and 50 are returned to ground through respective normally closed manual switches 61, 62, and through respective diodes **49*a* and shunt resistor 49*b*, and diode 50*a* and shunt resistor 50*b*. These diodes and shunt resistors are an aid in the triggering. If one side of suit 36 has just triggered, the emitter-to-base bias will be too great to trigger without a delay, therefore only triggerings occurring at the proper time are effective. These diodes prevent the triggering impulses from appearing in the video signals by preventing a false signal at an improper time from having any effect. Thus, only the side of 36 which is ready to trigger, will be triggered. The long period can be made overly long so that in the event of loss of synchronism, the multivibrator 36 will drift into synchronism within four scanned lines at the most. Once in synchronism, the long period is determined from the triggering pulses and not from the normal set time of 36. In this connection, it should be observed that 53 and 54 must be set for exactly 53 microseconds when 40 and 41 are in the on state. During the periods L only amplifier 22** is gated on, and during the periods *s* only the amplifier 31 is gated on. These periods as indicated in FIG. 2 are correlated with the composite video signal so that the duration of each short periods *s* is equal to the duration of the video signals representing the coresponding scanned line of the subject. On the other hand, the duration of each of the long periods L is equal to the duration of the corresponding video signal P plus the periods of the leading and trailing horizontal synchronizing pulses S and their associated horizontal blanking pulses. In other words, even though the inversion of the video signals takes place it in no way disturbs the timing and equal spacing of the horizontal synchronizing pulses S and their associated horizontal blanking pulses. The only difference with respect to the standard composite video signal, therefore, is that alternate line scans are represented by respectively inverted or negative-going phases while the intervening video line scans are represented by positive-going phases as illustrated in graph C or D of FIG. 2. The phase-coded output from point 35 is applied to an attenuation network or filter 42 which may have an attenuation characteristic such as shown in FIG. 3. The filter 42 is such that it reduces the amplitude of the low frequency components of the composite signal. For example it may produce a 20 db attenuation at 15.750 kc. and negligible attenuation beyond 157.500 kc. The effect of this filter is therefore to reduce the synchronizing and blanking signal levels and also to produce a highly noticeable loss of shading, contrast and definition in the reproduced picture unless the television receiver is equipped with a complementary restoring filter as will be described hereinbelow.

The composite video output from inverter 12 is applied through capacitor 43 to any well-known sync-separator which, for example, may be a transistor 44 which separates the horizontal synchronizing pulses S (graph A, FIG. 2) from the remainder of the video signal. These horizontal synchronizing pulses at collector 45 are then applied to the input of any well-known 2 to 1 or scale-of-two counter 38 which produces a square wave (FIG. 2B). Since such scale-of-two binary counters are well-known, detailed description herein is not necessary.

A second multivibrator 37 of the one-shot kind produces the pulses shown in FIG. 2G each time a 7.875 cycle is completed. In the standard television transmission systems each frame is scanned with 525 lines per frame and 30 frames per second, the horizontal synchronizing pulses having a frequency of 15.750 kc. and each pulse being 5 microseconds in width. Therefore there is produced at the point 46 a frequency of 7.875 kc. This 7.875 kc. signal is applied through capacitor 47 to the device 37 which produces at its output point 48 a 7.875 kc. signal of for example approximately 10 microseconds width (FIG. 2G).

The gating multivibrator 36 which may be of the free-running kind comprises a pair of transistors 49, 50. In one state of device 36 the downward-going edge of each pulse *p* (graph G FIG. 2) triggers the device 36 to initiate its free-running and accurately timed period. It should be observed that the two transistors 49 and 50 in the conventional way have their base electrodes and collector electrodes interconnected by respective capacitors 51 and 52. Each of the timing circuits includes the variable resistors 53, 54 which can be set so that in the absence of signals from unit 39 the alternate timed states are equal. However, by means of unit 39 it is possible to cause unit 36 to create alternate short stable states *s*, and intervening long stable states L. Furthermore, the short states may be created by device 49, and the long states by device 50, or vice versa depending upon the condition of unit 39. The unit 39 may be designed so that it switches the transistors alternately every ¼ second. In other words, the multivibrator 36 is synchronized by the downward-going edge of each of the pulses *p* and the outputs from device 36 represent the desired long and short cycles of gating voltage to be applied respectively to the emitters of the gating amplifiers 22 and 31, as determined by 40 and 41.

In other words, during each of the pulse periods L as shown in FIG. 2E the voltage at output point 56 of device 36 is negative and by means of resistor 58 it renders amplifier 31 conductive. At the same time the corresponding positive potential at output point 55 is applied through resistor 57 to render amplifier 22 nonconductive.

As will be seen from the graph D of FIG. 2 the duration of conductivity of amplifier 31 as determined by device 36 is correlated with the inversion of the video signals. On the other hand, when amplifier 22 is gated on (graph C) there is no inversion. By means of the action of 36, any part or all of the signal may be inverted at will. Thus, alternate scanned lines of the subject are represented by positive-going video signals, and the intervening alternate lines are represented by negative-going video signals, the switching of alternate long and short periods being synchronized to the video itself. The net result is that there is applied to the television transmitter 59 the complete composite video signal including all the video waves P as well as the usual synchronizing pulses and blanking pulses. In other words, the original composite signal from device 11 is the same as that applied to the transmitter 59 except that the alternate line scans are represented by video signals of opposite phase from the intervening line scans.

Since present-day television receivers utilize odd numbers of scanning lines to produce the well-known interlacing, according to this invention line #1 will be transmitted positive, line #2 negative and so on until line #525 will be transmitted positive. Therefore, line 526, which becomes the next line #1 in a 525 line system, will be produced negative. Thus, the lines composing alternate complete frames will be positive and negative overlays. Because of the persistence of vision as well as because of phosphor delay time on the screen of the picture reproducing tube, the alternation of positive and negative overlays on alternate frames causes effective visual cancellation and the viewer will see only a substantially completely grayish screen. However, when the decoder of the invention is used at the television receiver, as described hereinbelow in connection with FIG. 4, the original line scan, without alternate inverted overlay, is reproduced and the picture appears in its original recognizable form.

In the foregoing method only the line scans or video signals are modified without disturbing the normal horizontal synchronizing pulses. I have found that the coded picture can be even further protected against unauthorized reproduction by transmitting the horizontal synchronizing pulses alternating in reverse phases so that the picture is reproduced not only in a nonrecognizable grayish character, but the standard television receiver can not lock on to the synchronizing pulses and the picture drifts and becomes completely nonrecognizable.

For that purpose of the unit 39 which comprises a free-running multivibrator 63, 64 is connected to the switching transistors 40, 41 to alternately switch those transistors on and off. The transistors 40, 41 are biased so that normally they are nonconductive or in the off condition, but when switched alternately by the unit 39 they become conducting and by so doing effect the timing of the transistors 49, 50. When 40 is conducting, transistor 49 is off for the short period, 50 is on and transistor 22 passes the signal as shown in FIG. 2 (graph C). The separated sync pulses at point 65, in addition to controlling the unit 38 as above described, are also applied through the resistance 66 and associated capacitor 66*a*, which separates the vertical sync pulses from the horizontal, to the point 67 and thence through separate capacitors 68, 69 and their series resistors 70, 71 to the respective base electrodes 72, 73 of the transistors 63, 64. The transistors 63, 64 are interconnected in the usual way by respective capacitors 74, 75 so that their on and off successive cycles can be mutually controlled by their respective adjustable potentiometers 76, 77. When transistor 64 conducts, it applies a bias to 40 causing it to conduct and similarly, 63 being off causes 41 to be off. When 63 conducts 41 is biased on and 40 is turned off. This alternates the long and short periods so that 31 can be turned on for the short period via 22. As a typical adjustment, the timers 76, 77 can be set so that the transistors 40 and 41 are triggered alternately on and off each for a ¼ second interval.

As described hereinabove, when transistor 49 is in the on condition the emitter 80 is connected to ground through manually operable switch 61 and an inverted video signal is transmitted, and also the horizontal synchronizing pulses are inverted. When transistor 50 is on, the transistor 22 has its emitter connected to ground through manually operable switch 61 and an inverted or normal video signal is transmitted and the horizontal sync pulses are normal or uninverted.

If it is desired to transmit inverted sync pulses and inverted video on alternate line scans, the multivibrator 36 will be triggered as shown in graph D (FIG. 2). It should be observed that the emitters 82, 83 of transistors 63, 64 are returned to ground through respective manually operable switches 84, 85. These switches are normally closed so that the duration of the on and off conditions of transistor 40 is controlled automatically by transistor 63. In certain cases it may be desirable to hold the transistor 49 on for an unlimited period, in which case switch 62 is manually opened. Switch 62 is also used in the open condition when it is desired to transmit the inverted line scans as well as inverted sync pulses (graph D, FIG. 2). In that event, transistors 49 and 31 are in the on condition and the gating multivibrator 36 is inoperative. To transmit normal sync and video, i.e., with no phase change between the composite viedo input and the composite video output, switch 61 only should be open.

By opening switch 61 or 62, alternate inversion of the video line scans and the horizontal synchronizing pulses do not occur so that the only coding effect is the coded attenuation produced by the filter 42. On the other hand, when switches 84 or 85 are open, the coding is effected by filter 42 which is accompanied also by the coding obtained by the alternating video line scan conversion with sync pulses inverted (FIG. 2D) from the normal with 85 open. With switch 84 open the sync pulses are uninverted (FIG. 2C). Since all the usual blanking and synchronizing pulses together with the associated video signals are transmitted intact, by suitable decoding at the receiver, as will be described hereinbelow, the synchronizing stability and video signals will be reproduced faithfully.

Referring to FIG. 2, the graph A shows the separated horizontal sync pulses from transistor 44. These pulses trigger the binary unit 38 causing it to count down 2/1 and generate a 7.875 kc. square wave. One edge of that wave causes the one-shot multivibrator 37 to fire and generate a pulse of approximately ten microseconds duration at the 7.875 kc. rate (see graph G). The trailing edge of that wave is used to trigger the inverting multivibrator 36. As pointed out, when it is desired to transmit normal horizontal sync pulses while effecting the video line scan inversions, the multivibrator 36 will be triggered to produce the signal shown in graph C. This is done by switching the timing switch unit 39 on, by causing 64 to conduct. Normally, this is done automatically by the unit 39, but it may be controlled by hand by opening switch 84.

The foregoing described alternate inversion of the video line scan signals enables the system to be coded and incapable of reproducing satisfactory pictures if picked up and reproduced on a conventional television receiver. In accordance with the invention, therefore, and as will be described hereinbelow, the television receiver 60 is modified to effect the desired decoding, or the decoding may be effected in a separate unit connected ahead of the receiver 60, as will be described hereinbelow.

In order to modulate the transmitter 59 with the accompanying sound signals the sound source 86 is connected to a balanced modulator 87 which is supplied with a 31.5 kc. sine wave signal derived from a suitable oscillator 88. This oscillator is frequency locked by the 15.750 kc. signal from the sync separator 44. Its frequency is doubled by a frequency doubler 89. The output of modulator 87 is a 31.5 kc. suppressed carrier modulated by the voice frequencies or A.F. signals from source 86. This can then be multiplexed upon the aural carrier of the transmitter 59 in the manner well known in FM transmitters. It should be observed that the 7.875 kc. square wave signal from device 38 before application to the modulator 97 is passed through a ringing network 96 to convert it to a corresponding sine wave of 7.875 kc. This latter signal is the source of the decoding action for subscribers who are provided with a special television receiver 60 which is designed to decode the coded video signals from transmitter 59, or are provided with a conventional television receiver plus the decoder connected as an accessory ahead of the receiver. For other viewers having television receivers not equipped to decode the video programs, a special audio-frequency so-called barker signal may be applied to the transmitter 59 from source 98 to inform such nonsubscribing viewers that the program is coded and giving instructions as to the procedure or means required to enable such nonsubscribers to properly receive the coded video programs.

The 15.750 kc. carrier from oscillator 88 and the 7.875 kc. signal from circuit 93A are mixed in diode 97 to produce sum and difference signals or beats. The sum signal of 23.625 kc. is amplified by the transistor 93 causing 93A to ring at 23.625 kc. When the gate transistor 92 is on, transistor 93 is deprived of emitter-to-base bias and there is no output at the collector. In this way, 93A is allowed to ring at ¼ second intervals, which of course is determined by unit 39, and the 23.625 kc. signal is used to synchronize a corresponding unit at the receiver. The three sine wave signals 15.750 kc., 7.875 kc. and 23.625 kc. are mixed by the resistors 101, 102, 103 to produce a mixed group of sync signals. There is no nonlinearity, hence no beating—just an electrical summation. When this summed output is mixed with sound as from a microphone, the complete mixture is applied to the aural input of transmitter 59 in the usual manner for audio transmission, together with the suitable "barker" signal from source 98.

The ¼ second gating signal from unit 39, is also applied over conductor 90 and thence to the base electrode 91 of a gating transistor 92 which controls the transistor amplifier 93 by biasing it beyond cutoff when 92 is on. Amplifier 93 has an output circuit 93A tuned to 23.625 kc. and that output is mixed with other audio and is used at the receiver for decoding purposes as will be described hereinbelow.

A nonsubscriber will hear the 7.875 kc. whistle as well as the barker audio frequency signal which is used to carry a notice identifying the type of program being carried, and also to advertise the necessity of using a special subscription television set. It is heard only by persons whose sets are not provided with the decoding apparatus either as part of their television set or as an accessory unit thereto. It is applied together with the 15.750 kc., and 23.625 kc. to the normal sound input circuits of the transmitter 59. In other words the output of transmitter 59 comprises the composite video signal with the picture phase and sync pulses altered as hereinabove described. They are transmitted by the visual carrier of transmitter 59. The aural carrier of that transmitter has the barker sound signal as well as the 7.875 kc. tone, the 15.750 kc. tone, the 23.625 kc. tone and the 31.5 kc. double sideband suppressed carrier carrying the sound program accompanying the picture. All these various frequencies are superimposed and mixed for transmission in the usual manner. It should be observed that the audio modulations on the 31.5 kc. carrier should be limited to approximately 7.5 kc. swings. A single sideband filter can be inserted between the units 87 and 59 to make the aural program to be transmitted to subscribers as a single sideband signal, as an alternative to the double sideband suppressed carrier signal. In the case of the single sideband method the upper sideband can be used to transmit the 15.75 kc. audio signal.

Figure 4:
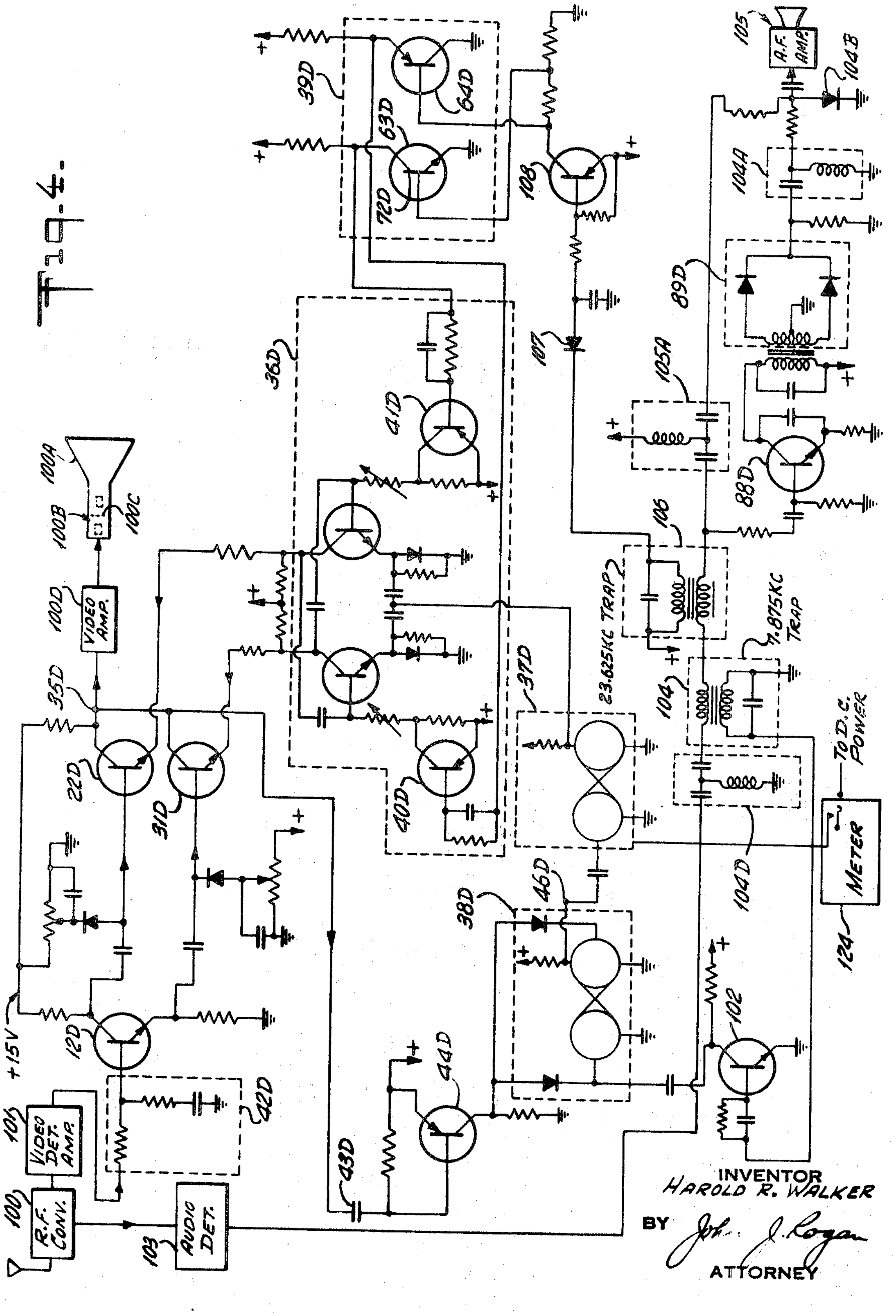
FIG. 4 is a composite schematic and wiring diagram of a television receiving system embodying the invention.

Referring to FIG. 4 there is shown a decoding circuit according to the invention. In this particular embodiment the decoding circuits are shown as an integral part of the conventional television received. Most of the decoding elements of *FIG*. 4 are similar to the coding elements of FIGS. 1*a* and 1*b* except they operate in the reversed sense, for decoding purposes. For simplicity of explanation, the decoding elements of FIG. 4, whose functions are similar to those of FIGS. 1*a* and 1*b* bear the same designation numerals but with the suffix D. Thus the received coded television signals after passage through the front end, or the usual R.F. amplifier and conversion stages 100, are detected in the video detector 101 and applied through the complementary filter 42D to the phase inverter 12D. The uninverted phase is applied to the normal gate 22D, and the inverted phase is applied to the inverter gate 31D. The output of the normal gate 22 is then amplified in a suitable video amplifier 100D and applied to the picture tube 100A to control the intensity of the scanning beam thereof in the usual manner. Thus the video signals are restored to their proper relation by restoring the low frequency components thereof to their full strength, as indicated by the dot-dash portion of the characteristic of FIG. 3.

The picture tube 100A has the usual electron gun 100B for producing a focused scanning beam which gun includes the electron emitting cathode (not shown) and the usual control grid 100C. The picture tube also includes the usual horizontal and vertical scanning circuits (not shown). Since the operation of such a picture tube is well-known in the television art, a detailed description thereof is not required herein, it being understood that the composite decoded video and sync pulses are applied in the usual manner to the scanning circuitry to effect the horizontal and vertical scanning. The video portion of the composite signal is amplified in any suitable amplifier 100D and may drive the cathode of the picture tube to vary the intensity of the scanning beam. Thus the picture is reproduced on the screen of tube 100A in the well-known manner.

However, the horizontal sync separator 44D instead of being driven directly from the inverter 12D is connected through capacitor 43D to the collector of the normal gate 22D since it must have normal video signals of a consistent polarity to function properly. The separated horizontal sync signals drive the 2/1 binary unit 38D. However, in order to insure that the binary unit 38D is always in proper phase with the corresponding divider 38 at the transmitter, it is necessary to supply it with a 7.875 kc. tone which is detected from the audio signal and used to operate switch 102. The 7.875 kc. tone as transmitted from the transmitter is detected in the audio-detector state 103 of the television receiver and by means of the 7.875 kc. selecting trap 104 it switches 102 to lock 38D in the correct phase. The output from detector 103 also includes the 15.75 kc. tone which is applied to the Colpitts oscillator 88D to lock it at that frequency. This locked frequency is doubled to 31.5 kc. in the diode doubler 89D and passed through a resonant filter 104A to remove the 15.75 kc. component. The 31.5 kc. is then applied to a diode detector 104B to detect the 31.5 kc. suppressed carrier multiplexed sound. After detection it passes to the sound amplifier and reproducer stage 105 of the television set. A filter 105A is connected in the signal path to reject all frequencies of 23.625 kc. and less. Filter 104D filters out and rejects the barker's signal.

The 23.625 kc. tone at the output of detector 103 is selected by trap 106 and rectified in rectifier 107 to switch on the normally off transistor switch 108. When 108 is on, it applies a potential to the base 72D of transistor 63D, which forms part of the switching pair 39D which, in effect, is a ¼ second timing switch operated by 23 kc. pulsed groups. With 63D on, trigger 41D is also on, which in turn renders gate 31D conductive for the long period and reinverts the received inverted video pulses. On the other hand, when no 23.625 kc. tone is present, the transistor switch 108 is off, and transistor 64D is on. This causes trigger 40D to conduct, and the normal gate 22D is switched on. Thus the on and off times of the multivibrator 36D are kept in step with the encoder unit 36 at the transmitter, and the video signals at 35D are all in the same phase as the original signals from the source 10 (FIG. 1*a*). The 23.625 kc. tone serves to synchronize unit 39D with the corresponding unit 39 at the transmitter.

It should be observed that at the transmitting encoder of FIGS. 1*a* and 1*b* multivibrator 39 is triggered by the usual vertical synchronizing pulses during the screen blanking interval, so that the changeover for the timing of devices 49 and 50 at the transmitter, and also of devices 49D, 50D at the receiver occurs during the vertical retrace or blanking period, and there is sufficient time for any readjustment needed in the binary output of unit 38D at the receiver, before the image on the television receiving tube becomes visible again. This avoids any visible disturbance in the reproduced image as a result of the inversion of the sync pulses.

Thus by means of the reinverting arrangement of FIG. 4, if the original signal had the alternate video components inverted, as in FIG. 2*c*, the inverted components would be restored to their proper relative phase, thus providing a consistent composite video-sync signal for application to the picture tube 100*a*. If the original signals had the alternate video components inverted as well as the sync pulses (graph 2*d*) then a similar consistent composite video-sync signal would be applied to the picture tube.

For purposes of fee collection from a set equipped with the decoding circuits, there is provided a metering device 124 which may be a recorder or a transponding oscillator for transmission of a suitable signal to a centralized metering station to meter the operation of the decoding system. Such metering devices are well known to the art, being in current use to record machine operating times, meter readings, value openings, etc. The use of a transponding oscillator makes it possible to make the reading at a remote point over a signaling wire. Such techniques are in common use by public utilities and railroads and need not be desired here. In order to preclude cheating, the metering device 124 is preferably connected to a part of the decoder, for example, to the timing delay one-shot multivibrator 37 or 37D in such a way as to render the said multivibrator inoperative if the metering system is removed or tampered with. Thus the metering device may include a normally closed set of jumper contacts through which the direct current power for the decoder is supplied to the unit 37D. Thus if the meter were unplugged or otherwise tampered with, there would be no power for the decoder since the normally closed jumper contacts would be open. It can be so designed that when removed and replaced it records the use of the set for decoding.

In the foregoing embodiment of FIG. 4 the decoding portion of the system requires a modification of the standard television receiving set. However, in accordance with another phase of the invention, the decoding can be effected in a separate unit which can be supplied as an accessory to the usual television set, and is capable of being connected between the receiving antenna and the usual antenna input terminals of the standard television receiver. In accordance with this feature, the decoding unit indicated by the dotted outline block in FIG. 5 decodes the received picture and sound as received from the transmitter of FIGS. 1*a* and 1*b* and locally restransmits the picture and sound information by modulating a local retransmitter forming part of the decoding unit, and whose retransmitted output can be connected to the input or antenna terminals of the standard or unmodified television receiving set. Such an arrangement is illustrated schematically in block diagram form in FIG. 5, wherein the parts which are similar in function to those of FIG. 4 bear the same designation numerals.

Figure 5:
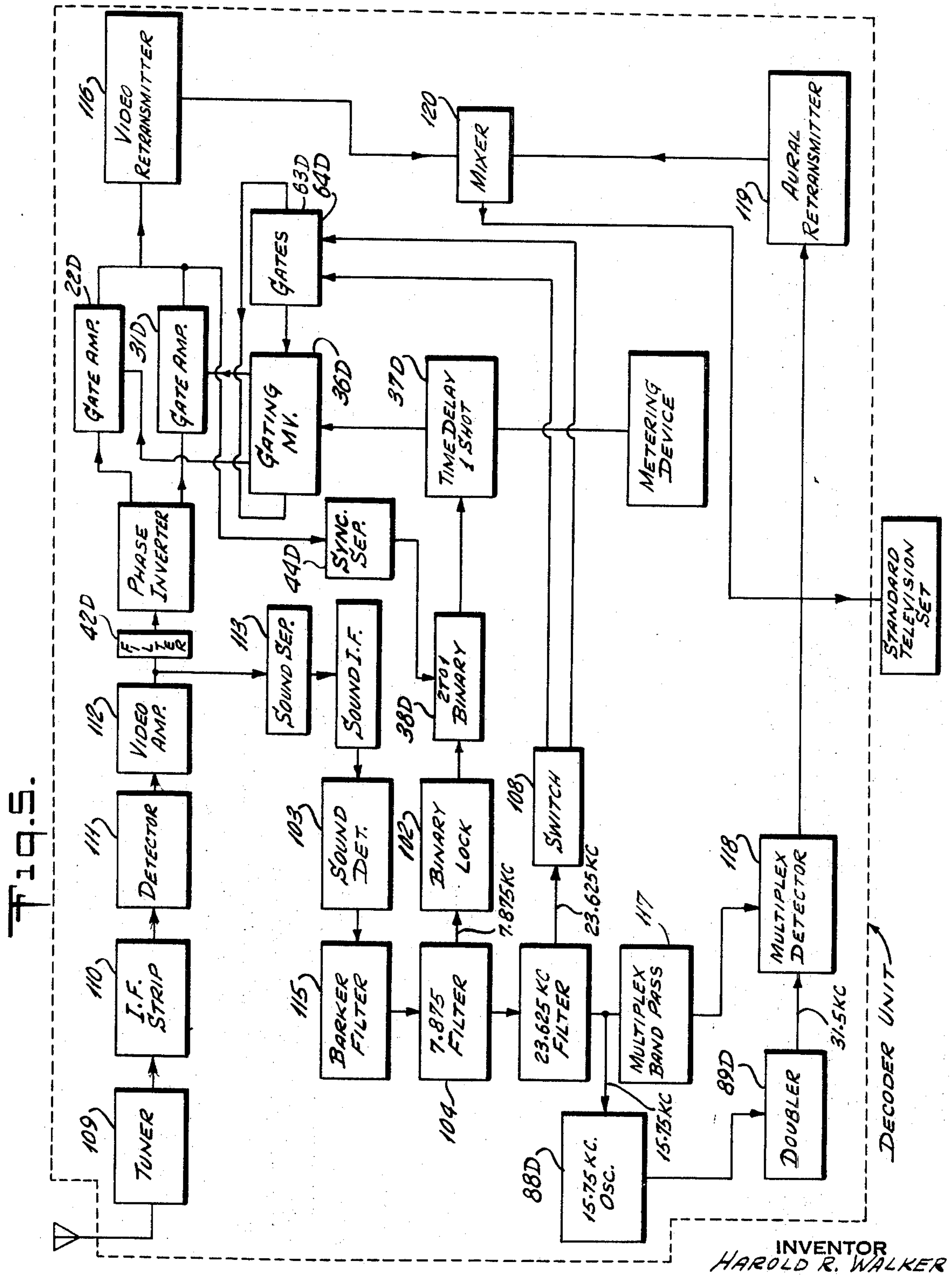
FIG. 5 is a modification of the system of FIG. 4.

Referring to FIG. 5 the receiving antenna is connected to the usual standard front end including the usual television channel tuner 109 which includes the usual radio frequency amplifiers and conversion stages. The converted output is amplified in the usual I.F. strip 110 and applied to the usual detector 111. The composite received television signal from detector 111 is amplified in the usual video amplifier 112 and the sound portion thereof in the form of an I.F. signal is separated in the usual sound separator 113 whose output is amplified in the usual I.F. sound amplifier 114, and the audio frequency modulations in the I.F. sound signal are detected in the usual sound detector 103. This detected output which includes the aforementioned audio-frequency barker signal is passed through the "barker" filter 115 for filtering out the barker signal but passing the audio-frequency sound as well as the control frequencies of 7.875 kc., 15.75 kc. and 23.625 kc. The 7.875 kc. tone is selected by filter 104 whose output, as hereinabove described, controls the binary switch 102 which in turn controls the phase of the 2/1 binary 38D.

As hereinabove described, the binary device 38D is controlled by the horizontal sync separator 44D and device 38D in turn controls the gated amplifiers 22D and 31D through the one-shot multivibrator time delay 37D and gating multivibrator 36D. If the transmitter of FIGS. 1*a* and 1*b* includes the coding filter 42, then the output of amplifier 112 is applied to the complementary decoding filter 42D. The gated output of amplifier 22D or 31D controls a video retransmitter 116, which may include an oscillator whose carrier frequency is capable of being adjusted to tune it to any one of the unused television channels. The signals from device 116 will therefore be a replica of the original video signals from source 10 except that they will be at a different carrier frequency corresponding to that of an unused television channel.

The 23.625 kc. signal from detector 103 controls the switch 108 which in turn controls the multivibrator gates 63D, 64D as hereinabove described.

The detected picture-accompanying multiplexed sound from detector 103 is passed through a bandpass filter 117 and is detected in the multiplex detector 118 where it is beaten with the 31.5 kc. signal from doubler 89D. Doubler 89D is supplied with the local oscillator frequency from oscillator 88D which is locked by the detected 15.75 kc. signal from 103. The output of mixer 120 is therefore a replica of the original picture-accompanying audio signals at the transmitter. They are then mixed with the retransmitted video signals from 116 in mixer 120. The output of mixer 120 can then be connected to the usual antenna input terminals 121, 122 of the standard television receiver 123, thus enabling the original detector and accompanying sound to be reproduced therein in the usual manner.

While for purposes of explaining the invention the system has been described wherein the inversion operation is effected on a complete scanning line, it will be understood that the inversion may be effected on any portion of the scanning line, or upon any group of lines in a given frame.

It will be obvious to those skilled in the art that all that is required to accomplish this is a variation of the switching circuits which control the various inversions. While the alternate line inversion method is a preferred embodiment, this invention is not limited thereto.

While certain specific embodiments have been described herein, it will be understood that various changes and modifications may be made therein without departing from the scope and objects of the invention.

What is claimed is:

1. A method of preserving security for image transmission systems and the like such for example as a private or subscription television system, which includes the steps of generating composite signals which include synchronizing elements and also video elements having low frequency components and high frequency components representing respective shade ranges of subject matter to be transmitted, selectively and abnormally distorting one of said ranges without correspondingly distorting the other of said ranges and reducing the low frequency component of the distorted and undistorted shade ranges by a preselected amount.

2. A method of preserving security for image transmission systems and the like such for example as a private or subscription television system, which includes the steps of generating video scan signals of one polarity phase corresponding to shade changes from white to black, generating intervening video scan signals of a polarity phase opposite to that of the first mentioned phase, said intervening video scan signals also representing shade changes from white to black, generating synchronizing signals between said scan signals, inverting the phase of the synchronizing signals and inverting the phase of said intervening scan signals.

3. A method of preserving security for image transmission systems and the like such for example as a private or subscription television system, which includes the steps of generating composite video signals having low frequency components and high frequency components representing respective shade ranges of a subject matter to be transmitted, selectively distorting one of said ranges without correspondingly distorting the other range, reducing the low frequency component of the distorted and undistorted shade ranges by a preselected amount, reemphasizing the low frequency components of the received video signal by an amount corresponding with the prior reductions, and restoring said ranges to their original undistorted relative characteristics.

4. A method of preserving security for image transmission systems and the like such for example as a private or television subscription system, which includes the steps of generating composite signals including synchronizing signals and video line scan signals, certain line scan signals having one polarity phase corresponding to shade changes from white to black and other intervening video line scan signals having a polarity phase inverted with respect to that of the first mentioned phase, also inverting the phase of certain of said synchronizing signals, receiving said composite signals and reinverting the inverted video line scan signals and the inverted synchronizing signals to produce a composite signal wherein all the line scan signals and synchronizing signals are uninverted.

5. An apparatus for preserving security for image transmission systems and the like such for example as a private or television subscription system, comprising means for generating composite signals having synchronizing elements and video line scan elements having low frequency components and high frequency components representing respective shade ranges of a subject matter to be transmitted, and means for selectively and abnormally distorting one of said ranges without correspondingly distorting the other range, and a high pass filter responsive to the distorted and undistorted composite signals to selectively attenuate the low frequency components at a predetermined rate.

6. An apparatus for preserving security for image transmission systems and the like such for example as a private or subscription television system, comprising means for generating video line scan signals of one polarity phase corresponding to shade changes from white to black, means for generating intervening line scan signals of a polarity phase opposite to that of the first mentioned phase, said intervening line scan signals also representing shade changes from white to black, means for generating synchronizing signals between successive line scan signals, and means for inverting the polarity phase of selected ones of said opposite polarity phase line scan signals without affecting the phase of said synchronizing signals.

7. The apparatus according to claim 6 and further including means for generating synchronizing signals between successive line scan signals, and means for inverting the phase of the synchronizing signals.

8. In a communications security system of the image transmission kind, the combination of means for producing a video signal wherein the polarity phase of the video components bears a predetermined relation to the maximum and minimum video shade ranges of subject matter to be transmitted, a phase inverter for said video components, an output circuit for said video signal, switch means effective in one condition to connect the uninverted video components to said output circuit and effective in another condition to connect the inverted video components to said output circuit, a timing circuit for causing said inverter to invert the video signals corresponding only to alternate video line scans.

9. The communications security system according to claim 8 and further including a sync separator for separating the sync elements from the video components, and means interconnecting said timing circuit and said sync separator to said switch means to invert alternate video line scan elements but without inverting the sync elements.

10. A communications security system according to claim 9 in which a signal-distorting network is provided between said switch means and said output circuit for selectively attenuating a predetermined low frequency range in said video signals.

11. A communications security system according to claim 8, in which the first mentioned means produces a composite signal including sync elements and video line scan elements, a sync separator for the sync elements, a timing circuit, circuit means interconnecting said timing circuit and sync separator to said switch means, and means for adjusting said timing circuit so that the duration of each signal inversion period is limited to the duration of each of said alternate video line scans while the duration of each uninverted period includes the remaining video line scan and sync signals.

12. In a communication security system of the image transmission kind, the combination of means for producing a video signal wherein the polarity phase of the video components bears a predetermined relation to the maximum and minimum video shade ranges of subject matter to be transmitted, a phase inverter for said video components, and output circuit for said video signal, switch means effective in one condition to connect the uninverted video components to said output circuit and effective in another condition to connect the inverted video components to said output circuit, a timing circuit for causing said inverter to invert the video signals corresponding only to alternate video line scans wherein said timing circuit includes a first multivibrator having two outputs each connected to a corresponding one of a pair of gates, said gates having a common output circuit, a separate input circuit for each gate, one such input circuit being supplied with normal video signals while the other such input circuit is supplied with inverted video signals, and means including a pair of manually settable switches for rendering the output pulse from one of said multivibrator outputs of longer duration than the output pulse from the other multivibrator output.

13. The system according to claim 12 in which an additional multivibrator is connected to the first mentioned multivibrator, said second multivibrator having a pair of manually settable switches for determining which output of the first mentioned multivibrator shall have the longer pulse.

14. In a communications security system of the image transmission kind comprising:

means for producing a video signal composed of video line scan signals and sync pulses and wherein the polarity of the video signal includes a predetermined relation to the maximum and minimum video shade ranges of subject matter to be transmitted, a phase inverter for said video components, an output circuit for said video signal, switch means effective in one condition for connecting uninverted video components to said output circuit and effective in another condition to connect the inverted video components to said output circuit, said switch means including an electronic switch having a pair of gates, with said gates coupled to the phase inverter, a multivibrator to produce gating pulses to render said gates alternately conductive, means for separating said sync signals from the video signal, means for triggering said multivibrator under control of said sync pulses, said triggering means including a one-shot multivibrator, means for dividing the separated sync pulses by a factor of two and applying the divided frequency signal to said one-shot multivibrator.

15. The system according to claim 14 in which the said separated signal is used to lock a carrier-oscillator at the same frequency, means to multiply the frequency of said oscillator, and means to modulate said oscillator with aural signals.

References Cited

UNITED STATES PATENTS

| | | | |
|---|---|---|---|
| 2,769,025 | 10/1956 | Hoffmann | 178—5.1 |
| 2,996,571 | 8/1961 | Nero | 178—5.1 |
| 3,069,492 | 12/1962 | D'Agostini | 178—5.1 |
| 3,242,258 | 3/1966 | Salit | 178—5.1 |

RICHARD MURRAY, Primary Examiner

H. W. BRITTON, Assistant Examiner

U.S. Cl. X.R.

178—6